Oct. 5, 1954
W. HOFFMANN
2,690,764
APPARATUS OF THE OVERFLOW TYPE FOR REGULATING THE
CONTINUOUS FLOW OF LIQUIDS THROUGH CONTAINERS
Filed Jan. 26, 1951
4 Sheets-Sheet 1
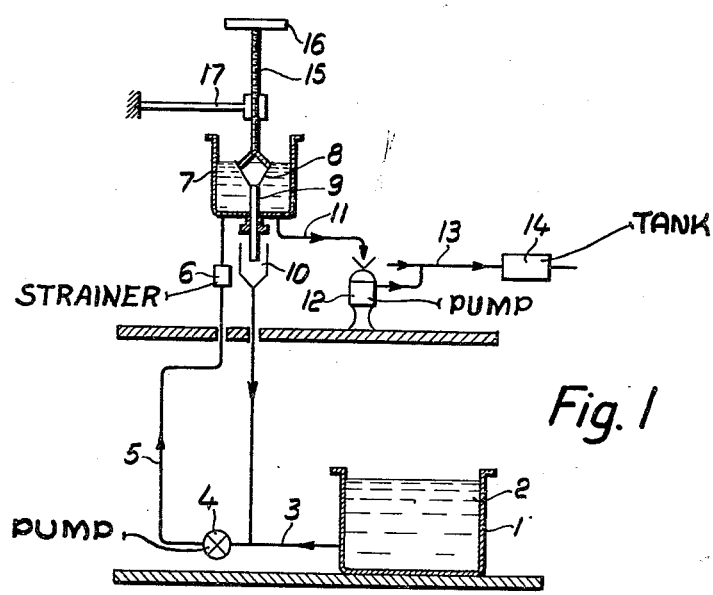
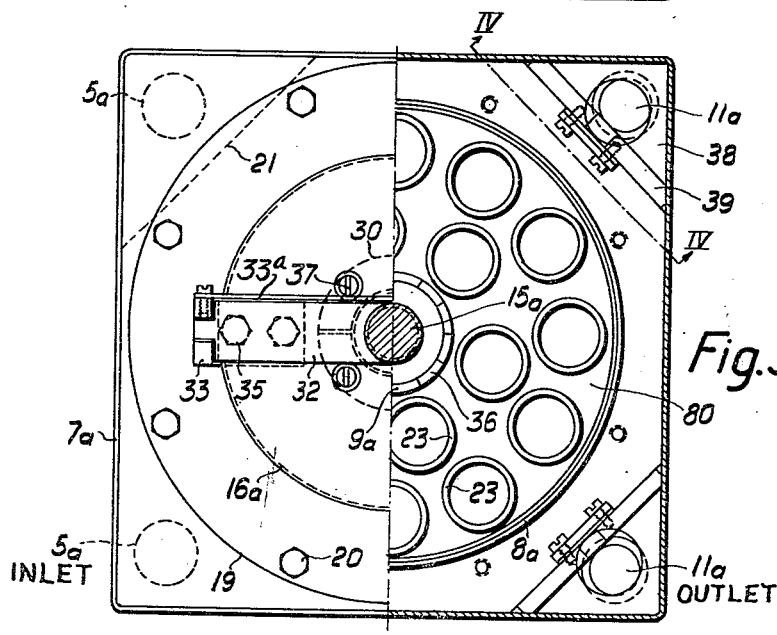
INVENTOR.
Walter Hoffmann
BY
Davis, Hope & Faithfull Oct. 5, 1954 W. HOFFMANN 2,690,764
APPARATUS OF THE OVERFLOW TYPE FOR REGULATING THE
CONTINUOUS FLOW OF LIQUIDS THROUGH CONTAINERS
Filed Jan. 26, 1951 4 Sheets-Sheet 3

INVENTOR.
Walter Hoffmann
BY

Oct. 5, 1954 W. HOFFMANN 2,690,764
APPARATUS OF THE OVERFLOW TYPE FOR REGULATING THE
CONTINUOUS FLOW OF LIQUIDS THROUGH CONTAINERS
Filed Jan. 26, 1951 4 Sheets-Sheet 4
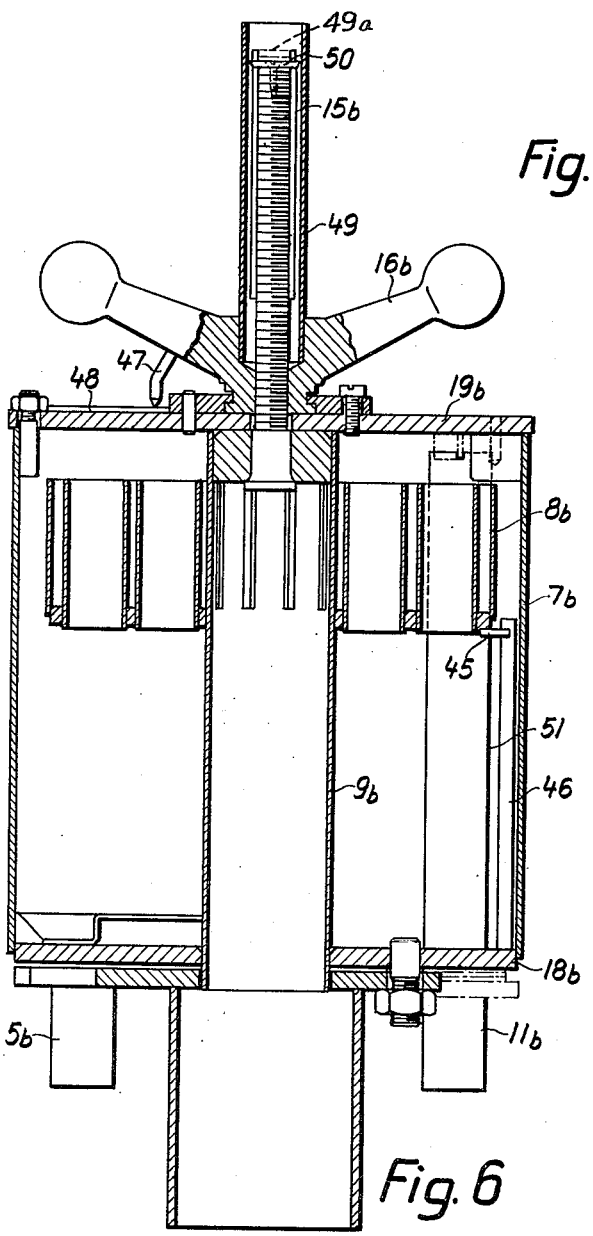
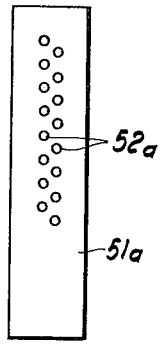
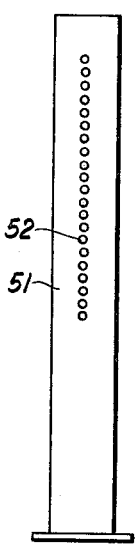
INVENTOR.
Walter Hoffmann Patented Oct. 5, 1954

2,690,764

UNITED STATES PATENT OFFICE 2,690,764

APPARATUS OF THE OVERFLOW TYPE FOR REGULATING THE CONTINUOUS FLOW OF LIQUIDS THROUGH CONTAINERS

Walter Hoffmann, Lidingo, Sweden, assignor to Aktiebolaget Separator, Stockholm, Sweden, a corporation of Sweden Application January 26, 1951, Serial No. 207,978

11 Claims. (Cl. 137—563)

This invention relates to apparatus for regulating the continuous discharge of liquid from a container provided with inlet and outlet members for the liquid and with an overflow device for keeping a constant liquid level in the container.

With prior apparatus of this type, liquid could be discharged from the container at a fixed rate through the outlet member by utilizing the constant liquid level in the container. The constant liquid level presumes a constant supply of liquid to the container at a rate at least equal to but preferably larger than the discharge rate through the outlet member, so that there will be a continuous and simultaneous discharge through the overflow device which gives full guarantee that the liquid level does not drop below the overflow edge. When it was desired to regulate the liquid discharge rate from the container through the outlet member, this was done by means of a throttling member, for example, a needle valve in a pipe communicating with the outlet member. Throttling members, however, are apt to become clogged by dirt, which interferes with a desired accurate regulation. Moreover, throttling members do not permit the device to be used in practice for regulation over wide limits, for example, from 10 litres/hour to 450 litres/hour.

An object of the invention is to provide an apparatus for regulating the rate of continuous discharge of the liquid from the vessel, the apparatus being adjustable over a very wide range, from a very small to a very great discharge rate of the liquid, and at the same time being insensible to clogging by dirt.

Another object of the invention is to prevent fluctuations in the liquid head in the vessel, due to an abnormal rise of the liquid level over the edge of the overflow device. This rise occurs when the discharge rate of liquid through the overflow device should be large but is not so, that is to say, when, with a constant rate of supply of liquid to the container, the discharge through the outlet member is throttled considerably.

A characterizing feature of the invention is that the outlet member of the vessel and the overflow device are mounted for relative movement in a vertical direction, whereby such relative movement causes a change in the liquid discharge rate through the outlet. Another feature is that the overflow device is provided with a level overflow edge of greater length than the length of the perimeter around the smallest throughflow area of the overflow device. Still another feature resides in the combination of the relatively adjustable outlet member and overflow device of the container with a sub-chamber in the container connecting it with the outlet member, whereby the sub-chamber controls the extent to which the discharge rate through the outlet member varies with changes in the liquid level in the container as determined by the aforementioned relative adjustment. Other features of the invention and their advantages will be understood from the embodiments which will be described below with reference to the accompanying drawings, in which:

Fig. 1 is a diagrammatic illustration, partly in vertical section, of a plant provided with an apparatus according to the invention for regulating the continuous supply of lye in fixed proportions to a member which feeds the lye to a mixer against a counter-pressure in the mixer;

Fig. 3 is a plan view, partly in section, of the apparatus illustrated in Fig. 2;

Fig. 6 is a view similar to Fig. 2 but showing a modification of the apparatus;

Fig. 7 is an elevational view of the part forming the sub-chamber in Fig. 6;

Fig. 8 is a view similar to Fig. 7 but showing a modification of the part;

Figure 2:
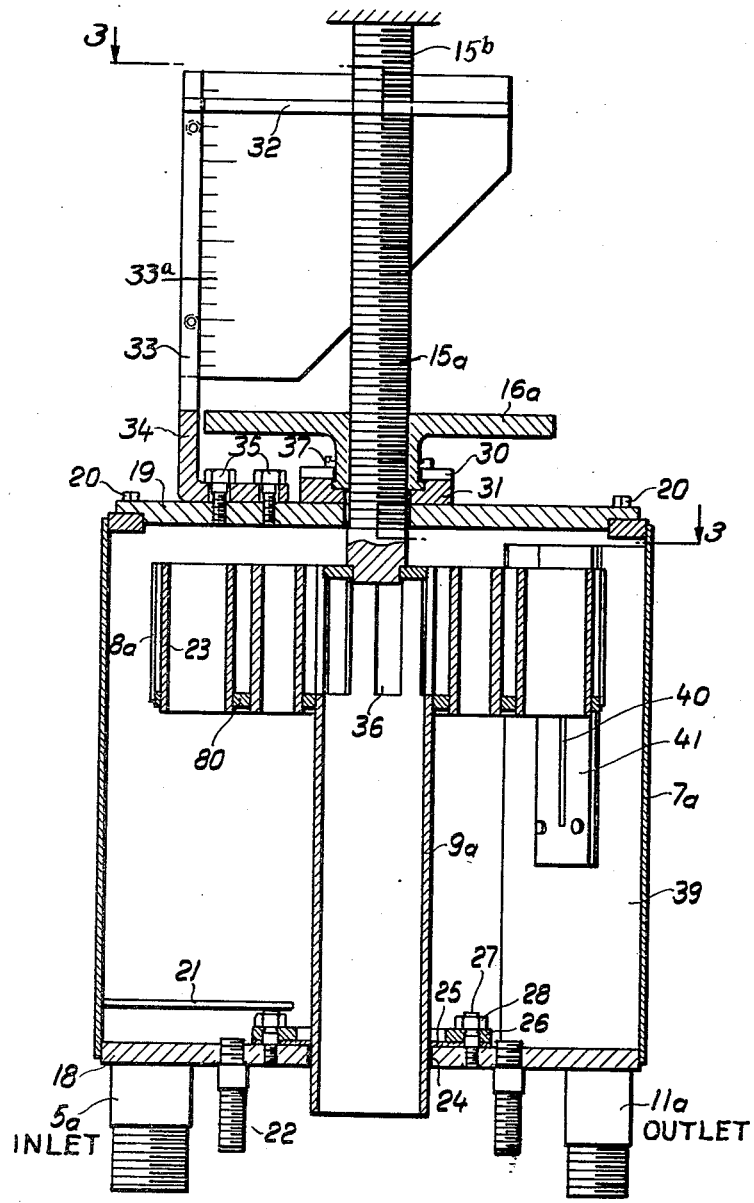
Fig. 2 is a partial vertical sectional view of an apparatus according to the invention.
Figure 4:
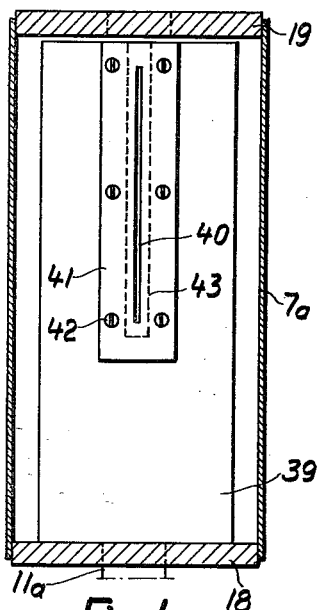
Fig. 4 is a sectional view on the line IV—IV in Fig. 3.

The arrangement according to Fig. 1 comprises a tank 1 containing lye 2 which is fed to a container 7 through a pipe 3, a pump 4, a pipe 5 and a strainer 6. In container 7 the lye is kept at a constant head by an overflow device 8, which is in the form of a funnel having a tube 9 extending through the bottom of the container 7 and ending in a pipe 10 which communicates with the pipe 3. Thus, the lye flowing back through the pipe 10 is returned to the pump 4 and is not lost. Lye is discharged from the container 7 at the bottom through the outlet member 11, which is in the form of a pipe, and is fed at atmospheric pressure to a device 12 adapted to feed the lye against a counter-pressure, if necessary variable, into an oil pipe 13 for subsequent reaction with the oil in tank 14. It will be understood that the lye is fed into the pump 12 at a predetermined rate through the open pipe 11 without any risk of clogging and at a constant pressure head.

In order to enable variations in the rate of flow of lye through pipe 11, the liquid level in container 7, according to this embodiment of the invention, is made regulatable by suspending the overflow device 8 from a threaded spindle 15 provided with a wheel 16 and turnable thereby in a fixed nut device 17. By turning the wheel 16, the funnel 8 and its pipe 9 are raised or lowered, so that the liquid head in the container 7 rises or drops and the pressure is increased or reduced, which results in an increased or reduced rate of discharge of liquid through pipe 11. The upper diameter of the funnel 8 is large in relation to the diameter of the pipe 9 in order to ensure immediate discharge of any excess liquid through the overflow device and prevent the liquid from rising appreciably over the edge of the overflow. Other and less bulky devices for this purpose will be described below. It is of very little significance whether or not there are packing devices between the container 7 and pipe 9, because the liquid discharging this way is returned to the pump 4 through pipe 10.

The arrangement according to Figs. 2-5 comprises a tank 7a provided with a bottom 18 and a cover 19. The latter is fixed to the tank 7a by bolts 20. The tank is provided with an inlet 5a and an outlet 11a for lye. Some distance above the orifice of the inlet member 5a of tank 7a is a guiding or baffle plate 21. The tank 7a is fixed to a foundation (not shown) by studbolts 22. The overflow device includes a vessel or tank 8a open at the top and provided with a horizontal bottom 80, the tank being connected to and communicating with a central vertical pipe 9a. Pipes 23, open at both ends, extend through the bottom 80 and have their upper surfaces on a level with the upper edge of the tank 8a. The pipe 9a extends down through an opening 24 in the bottom 18 and makes a tight joint with the latter by means of a packing 25 secured to the bottom 18 by a ring 26, studbolts 27 and nuts 28. The overflow device 8a is carried by a threaded spindle 15a fixed to it and extending upward through an opening in the cover 19. The spindle 15a is threaded through a wheel 16a rotatably held on the cover 19 between two fixed shoulders 30 and 31. The upper end of the spindle 15a is provided with an arm 32 extending at its free end into a vertical groove 33 of a guide arm 34 fixed to cover 19 by bolts 35. By rotating the wheel 16a, the discharge device 8a is raised or lowered in tank 7a without undergoing a rotating movement therein, owing to the guiding effect of the arms 32 and 34. The arm 32 may thereby serve as an indicator which shows the position of the discharge device 8a in tank 7a, on a scale 33a fixed to the arm 34. The pipes 23 constitute a means of increasing, within a small volume, the length of the outlet or overflow edge of the discharge device 8a. It thereby becomes possible to make the tank 7a with a small horizontal cross section. The upper end of pipe 9a extends through the cylindrical vessel 8a and serves as a support for the spindle 15a, which is welded to the pipe 9a. The latter communicates with the vessel 8a through vertical slots 36 in its wall. The shoulder 30 is fixed to the shoulder 31 by screws 37, and the latter shoulder is welded to the cover 19. In this embodiment, the tank 7a has a square horizontal section, and the inlet and outlet members 5a and 11a are arranged each in a different corner of the tank. If desired, the inlet and outlet members may be doubled, as indicated in Fig. 3. The outlet member 11a is connected to a sub-chamber 38 separated from tank 7a by a plate 39. The chamber 38 communicates with the interior of tank 7a by a slot 40 in the wall 39. In order to enable easy alteration of the size and shape of slot 40, this may be arranged in a separate plate 41 which is exchangeably fixed to the plate 39 by screws 42 over a large opening 43 in the plate.

Figure 9:
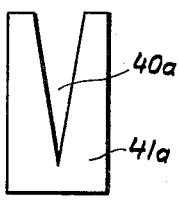
Figs. 9 and 10 are elevational views of modifications of the flow control plate of Fig. 4.
Figure 10:
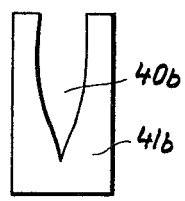

By rotating the wheel 16a, the overflow device 8a, 9a is raised or lowered in the tank 7a and thereby determines the liquid head in the tank. Because the liquid can also rise in pipes 23 and overflow their edges into the cylindrical vessel 8a and discharge through pipe 9a, the liquid head in tank 7a can never be appreciably higher than the free edges of the pipes 23 or the edge of vessel 8a, the said edges lying in the same horizontal plane. The liquid head in tank 7a therefore always follows the movements of the overflow device 8a, 9a almost exactly, if, as was assumed, the rate of supply of liquid through the inlet 5a is always larger than the rate of discharge through outlet 11a. The arrangement therefore affords a possibility of accurately regulating the pressure head of the liquid discharging through the outlet 11a. The slot 40 by which the tank 7a and the discharge member 11a communicate affords another regulating possibility. When the liquid head in tank 7a rises, the effective outlet area through the slot 40 is enlarged, so that in order to increase the discharge rate of liquid through the outlet 11a, the head of liquid in tank 7a need not be increased in the same degree as would be necessary if the outlet area through slot 40 were constant for all liquid heads in the tank 7a. This means increased sensibility of the regulation when the overflow device 8a, 9a is raised or lowered slightly relative to the tank 7a. By replacing the plate 41 with another plate having a different slot width, the plant can be altered to produce a different ratio or characteristic of regulation. For example, with the plate 41a of Fig. 9, the wedge-shaped slot 40a causes the discharge rate to increase more rapidly as the head in tank 7a increases than with the plate 41; and in the plate 41b of Fig. 10, the slot 40b is constructed according to a given curve which may be ascertained by experiments or otherwise. Thus, the discharge rate of the liquid through outlet 11a can be made to follow a given curve or straight line, upon increase in the liquid head in tank 7a.

Figure 11:
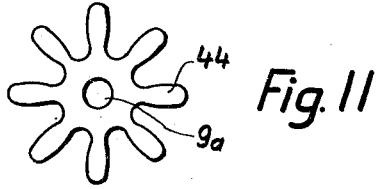
Fig. 11 is a plan view of another form of the overflow device, showing the overflow edge.
Figure 5:
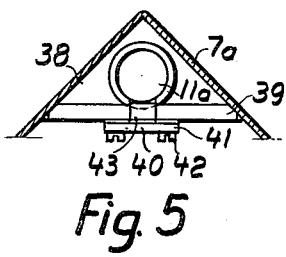
Fig. 5 is a horizontal sectional view of the part illustrated in Fig. 4.

The cylindrical vessel 8a can, if desired, be replaced by the conical funnel of Fig. 11, the rim 44 of this funnel being corrugated in order to increase considerably the length of the overflow edge of the device within a small volume.

Instead of raising and lowering the overflow device 8a, 9a of Figs. 2-5, this device may be fixed and the tank 7a movable vertically. In that case the arm 32, spindle 15a and pipe 9a are suspended from a fixed support S (Fig. 2) as by screwing the spindle extension 15b tightly therein, and the studbolts 22 are then released, so that the tank 7a becomes movable vertically. The threaded extension 15b thus constitutes a means for supporting the overflow device 8a in a fixed vertical position. When rotating the wheel 16a, the tank is then raised or lowered in relation to the overflow device 8a, 9a. Thus, the liquid head in tank 7a is altered and, consequently, the effective discharge area through slot 40, enabling the desired regulation of the rate of flow of liquid through outlet member 11a.

Referring now to Figs. 6, 7 and 8, the overflow device 8b, 9b is prevented from rotating in relation to tank 7b by a fork-shaped projection 45 of the overflow device, engaging with a vertical guiding rod 46 on the inside of tank 7b. The wheel 16b is also provided with a pointer 47 indicating on a scale 48 on the cover 19b the rotation angle as part of one turn, whereas a slotted tube 49, graduated as shown at 49a, measures the number of turns or rotations. The latter are indicated on tube 49 by a pointer 50 fixed to the threaded spindle 15b. In the Fig. 6 embodiment, the plate 39 of Fig. 2 is replaced by a vertical tube 51 extending from the bottom plate 18b of Fig. 6 through the tank 7b and thereby defining a sub-chamber. At its lower end, the tube 51 communicates with the outlet member 11b. The side wall of tube 51 is provided with a series of holes 52 arranged at a distance from one another along a vertical line (Fig. 7) and placing the tank 7b in communication with the outlet 11b. A modified form of the tube 51 is illustrated in Fig. 8. As there shown, the tube 51a has holes 52a in two series at a distance from one another and with the holes mutually displaced along two vertical lines. The arrangement of Fig. 6 operates in substantially the same manner as the arrangement of Fig. 2. As an alternative, the plate 41 of Figs. 2-5 may be provided with openings similar to those in the tube 51 or 51a of Figs. 7 and 8, instead of a slot, and vice versa. Both the slots 40 and the openings 52, 52a may be made large enough to avoid any risk of clogging by dirt.

Figure 12:
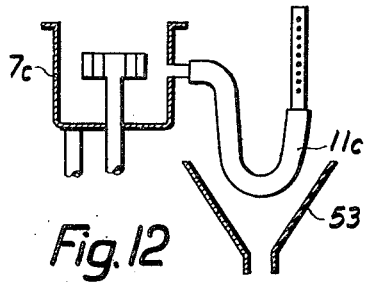
Fig. 12 is an elevational view, partly in section, of another modification in which the outlet member of the container has its opening movable in vertical direction relative to the overflow device.
Figure 13:
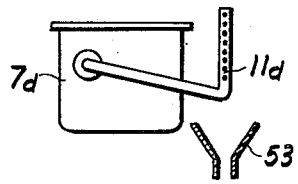
Fig. 13 is a view similar to Fig. 12 but showing the outlet member swingably connected with the container in order to raise or lower the outlet opening in relation to the overflow device.

In Figs. 12 and 13, I have shown apparatus according to the invention provided with discharge members 11c and 11d movable vertically in relation to the liquid level in tanks 7a and 7d, respectively. In Fig. 12, the vertical movement is made possible by using a flexible hose for part of the member 11c, and in Fig. 13 by connecting the member 11d rotatably with tank 7d. In both instances it is thus possible to raise or lower the outlet opening of members 11c and 11d, so that the rate of liquid discharge from the tank through the said members is in both cases regulatable. The discharged liquid is collected in a device 53. The apparatus of Figs. 12 and 13 may have fixed or movable tanks 7c and 7d and also discharge devices of the types described.

Figure 14:
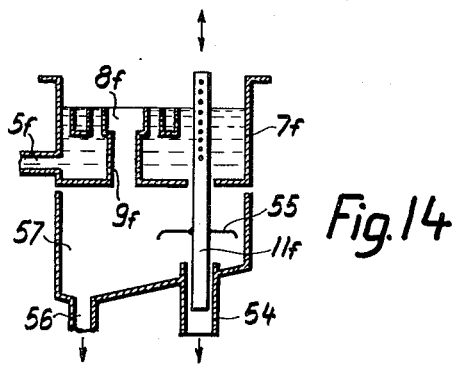
Fig. 14 is a vertical sectional view of another modification having an outlet member vertically movable relative to the overflow device.

Referring to Fig. 14, the tank 7f and the discharge device 8f with pipe 9f are fixed in relation to one another, whereas the discharge member 11f is in the form of a perforated tube vertically movable in the tank 7f and ending in the outlet pipe 54. The pipe 11f is provided with a baffle 55 which prevents liquid leaking from tank 7f along the pipe 11f from discharging through pipe 54. This liquid is discharged through pipe 56, which also serves as a discharge for liquid from tube 9f collected in tank 57 and returns this liquid to a pipe which conducts it back into the tank 7f through the inlet 5f. The tank 57 is fixed to tank 7f in any suitable manner (not shown), and the pipe 11f is raised and lowered by a device of any known type (not shown). The raising and lowering of the tank 7, the overflow device 8, 9 and the outlet member 11 may be effected in many ways other than those illustrated and described. Both manual and automatic regulation may be used.

It will be apparent that the parts 22, 19, 31, 16a and 15a of Fig. 2 (and the corresponding parts of the other embodiments) constitute means supporting the outlet member 11a and overflow device 8a, 9a for relative movement in a vertical direction, to vary the discharge rate through the outlet member. By making the part 16a rotatable, as described, it becomes an adjustment member for raising and lowering the overflow device in the container. When the parts 22 are eliminated, the parts 5, 15a, 16a, 30, 31 and 19 constitute the aforementioned supporting means, in which case rotation of adjustment member 16a raises or lowers the container relative to the overflow device. The plates 39, 41 constitute a partition member in the container 7a forming a sub-chamber separate from the main portion of the container into which the inlet 5a leads, as does the tube or pipe 51 of Fig. 6. The screws or bolts 42 (Fig. 4) form a means for releasably securing the portion member 41 in the container.

I claim:

1. Apparatus of the character described comprising a liquid container having a liquid inlet, a liquid outlet member connected to and communicating with the container for discharging liquid therefrom, a liquid overflow device in the container for discharging liquid therefrom independently of said outlet member, to maintain in the container a substantially predetermined liquid head above the outlet member, an element forming in the container a sub-chamber leading to the outlet member, said element having vertically elongated passage means affording communication between the sub-chamber and the main part of the container, and means supporting said outlet member and overflow device for relative movement in a vertical direction through a range wherein the liquid level maintained by the overflow device coincides with said vertically elongated passage means, to vary the rate of liquid discharge through said passage means to the sub-chamber and outlet member.

2. Apparatus according to claim 1, comprising also a pointer and a scale, one connected to the overflow device and the other to the container, for indicating the relative vertical movements of the overflow device and outlet member.

3. Apparatus according to claim 1, in which said inlet is located in the bottom of the container, and comprising also a baffle in the container overlying said inlet.

4. Apparatus according to claim 1, in which said outlet member is a pipe connected to and movable vertically relative to the container.

5. Apparatus according to claim 1, comprising also means for supporting the overflow device in a fixed vertical position.

6. Apparatus according to claim 1, in which said element forming the sub-chamber is a tube extending upward in the tank.

7. Apparatus of the character described comprising a liquid container having a liquid inlet, a liquid outlet member connected to and communicating with the container for discharging liquid therefrom, a bowl in the chamber having an overflow edge, a discharge tube extending downward from the bowl through the bottom of the container, overflow tubes in the bowl extending through the bottom thereof and having at their upper ends overflow edges at the level of said bowl edge, and means supporting said outlet member and bowl for relative movement in a vertical direction, to vary the liquid head above the outlet member and the discharge rate therethrough.

8. Apparatus of the character described comprising a liquid container having a liquid inlet, a liquid outlet member connected to and communicating with the container for discharging liquid therefrom, a liquid overflow device in the container for discharging liquid therefrom independently of said outlet member, to maintain in the container a substantially predetermined liquid head above the outlet member, said overflow device including a bowl having an overflow edge, a discharge tube extending downward from the bowl through the bottom of the container, and overflow tubes in the bowl extending through the bottom thereof and having at their upper ends overflow edges at the level of said bowl edge, means supporting said outlet member and overflow device for relative movement in a vertical direction, to vary the rate of discharge through the outlet member, and a return pipe outside the container and connecting said overflow device with the container.

9. Apparatus of the character described comprising a liquid container having a liquid inlet, a liquid outlet member connected to and communicating with the container for discharging liquid therefrom, a liquid overflow device in the container for discharging liquid therefrom independently of said outlet member, to maintain in the container a substantially predetermined liquid head above the outlet member, a partition member in the container forming a sub-chamber communicating with the outlet member, said inlet leading into a main portion of the container outside the sub-chamber, said partition member having vertically elongated passage means for flow of liquid from said main portion to the outlet member by way of the sub-chamber, said container having plane walls and said partition member being a plate located at a corner portion of the container, and means supporting said outlet member and overflow device for relative movement in a vertical direction through a range wherein the liquid level maintained by the overflow device coincides with said elongated passage means, whereby the discharge rate through the outlet member can be varied.

10. Apparatus of the character described comprising a liquid container having a liquid inlet, a liquid outlet member connected to and communicating with the container for discharging liquid therefrom, a liquid overflow device in the container for discharging liquid therefrom independently of said outlet member, to maintain in the container a substantially predetermined liquid head above the outlet member, a partition member in the container forming a sub-chamber communicating with the outlet member, said inlet leading into a main portion of the container outside the sub-chamber, said partition member having vertically elongated passage means for flow of liquid from said main portion to the outlet member by way of the sub-chamber, means releasably securing the partition member in the container to permit replacement thereof, and means supporting said outlet member and overflow device for relative movement in a vertical direction through a range wherein the liquid level maintained by the overflow device coincides with said elongated passage means, whereby the discharge rate through the outlet member can be varied.

11. Apparatus of the character described comprising a liquid container having a liquid inlet, a liquid outlet member connected to and communicating with the container for discharging liquid therefrom, a liquid overflow device in the container for discharging liquid therefrom independently of said outlet member, to maintain in the container a substantially predetermined liquid head above the outlet member, a partition member in the container forming a sub-chamber communicating with the outlet member, said inlet leading into a main portion of the container outside the sub-chamber, said partition member having a generally vertical slot for flow of liquid from said main portion to the outlet member by way of said sub-chamber, and means supporting said outlet member and overflow device for relative movement in a vertical direction through a range wherein the liquid level maintained by said device coincides with said slot, whereby the discharge rate through the outlet member can be varied.

References Cited in the file of this patent

UNITED STATES PATENTS

| Number | Name | Date |
| --- | --- | --- |
| 1,138,107 | Hill | May 4, 1915 |
| 1,516,802 | Wellman et al. | Nov. 22, 1924 |
| 1,625,592 | Conant et al. | Apr. 19, 1927 |
| 1,684,971 | Rosholt et al. | Sept. 18, 1928 |
| 1,743,966 | Goudard | Jan. 14, 1930 |
| 1,783,249 | McMillen | Dec. 2, 1930 |
| 1,891,238 | Oswald | Dec. 20, 1932 |
| 2,069,261 | Monnet | Feb. 2, 1937 |
| 2,122,705 | Welborn et al. | July 5, 1938 |
| 2,368,990 | James | Feb. 6, 1945 |
| 2,588,869 | Pinaire | Mar. 11, 1952 |